July 28, 1925.
1,547,897
J. B. BURPO
AUTO CONSTRUCTION
Filed Feb. 5, 1924  4 Sheets-Sheet 1
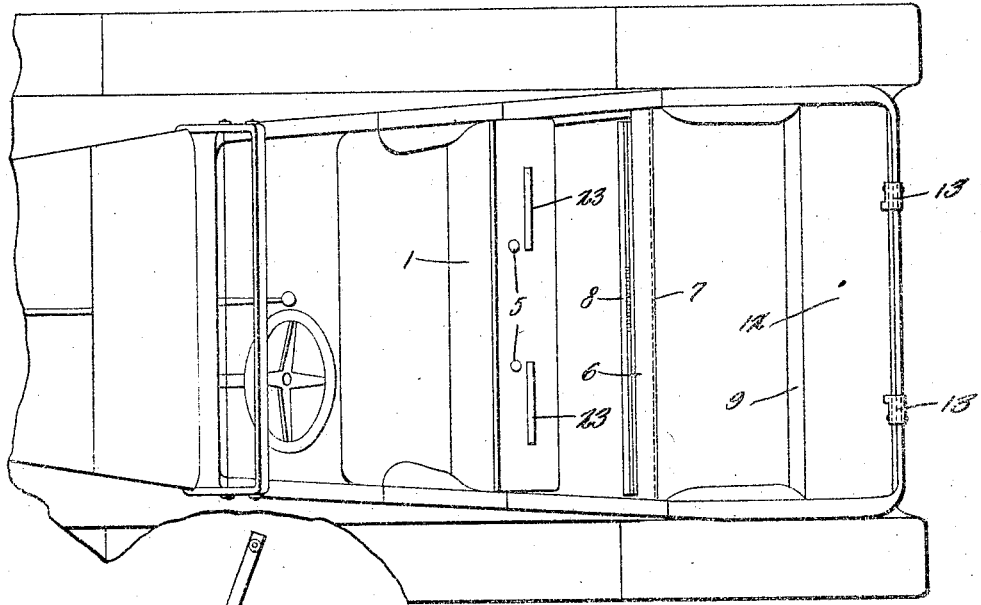

July 28, 1925.
J. B. BURPO
AUTO CONSTRUCTION
Filed Feb. 5, 1924 4 Sheets-Sheet 2
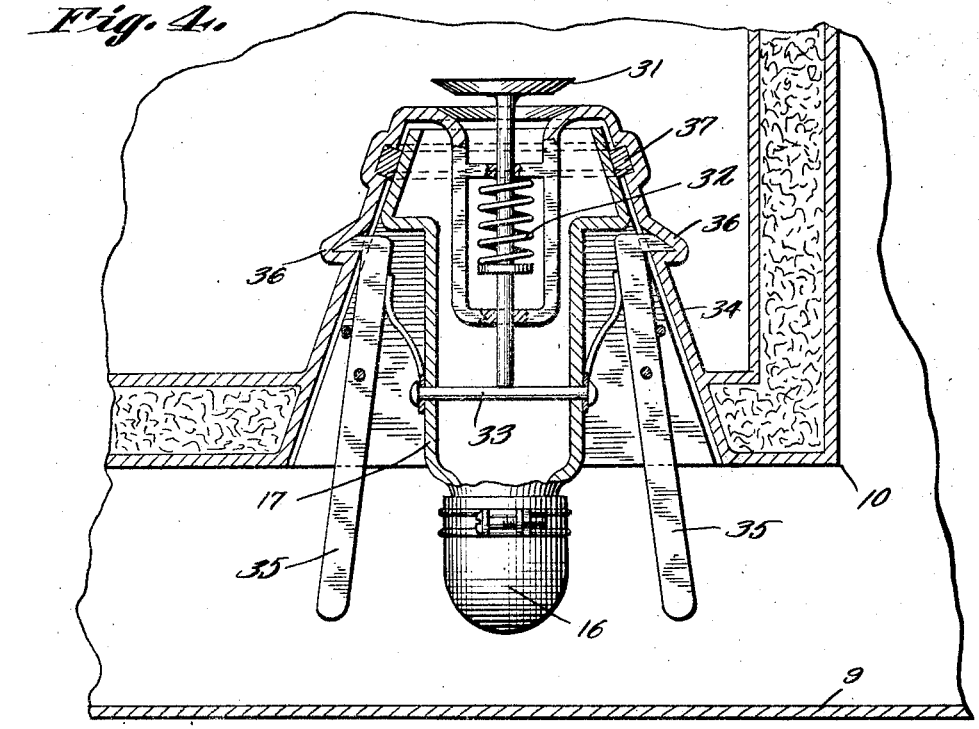
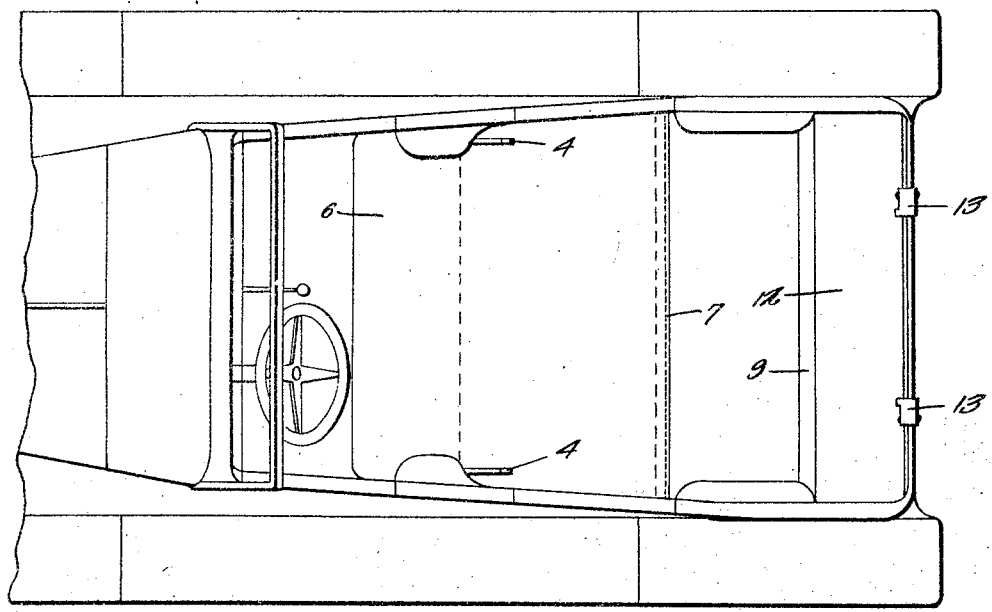
J. B. Burpo,
INVENTOR July 28, 1925.
J. B. BURPO
AUTO CONSTRUCTION
Filed Feb. 5, 1924
1,547,897
4 Sheets-Sheet 3
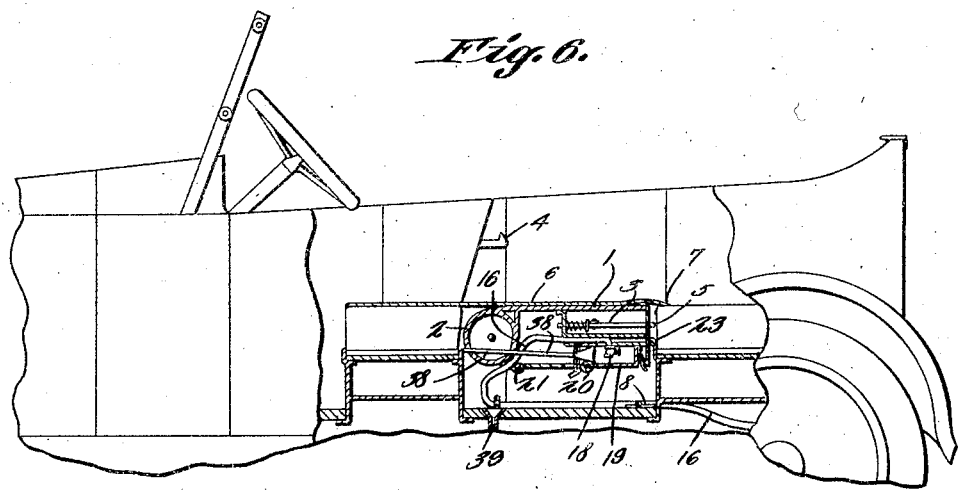
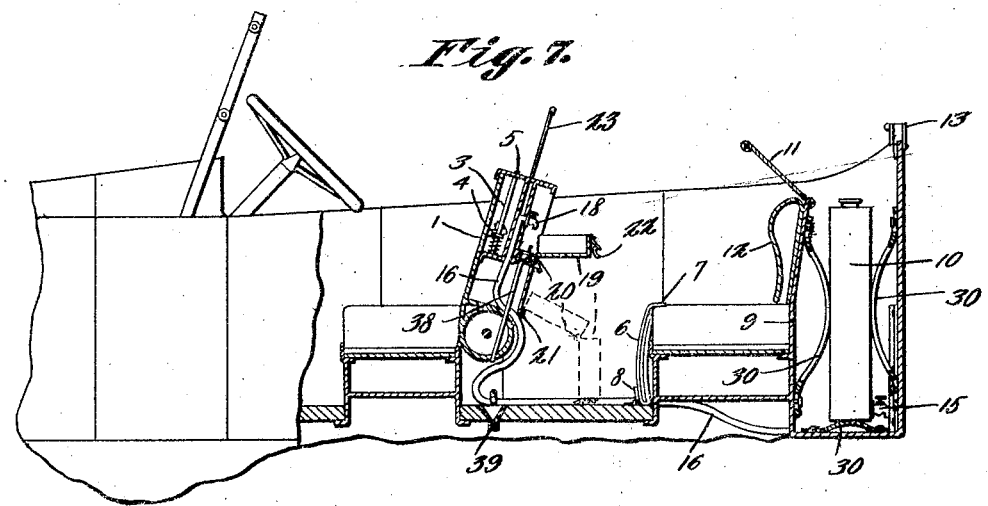
J. B. Burpo,
INVENTOR
BY Victor J. Evans
ATTORNEY July 28, 1925.
J. B. BURPO
1,547,897
AUTO CONSTRUCTION
Filed Feb. 5, 1924    4 Sheets-Sheet 4
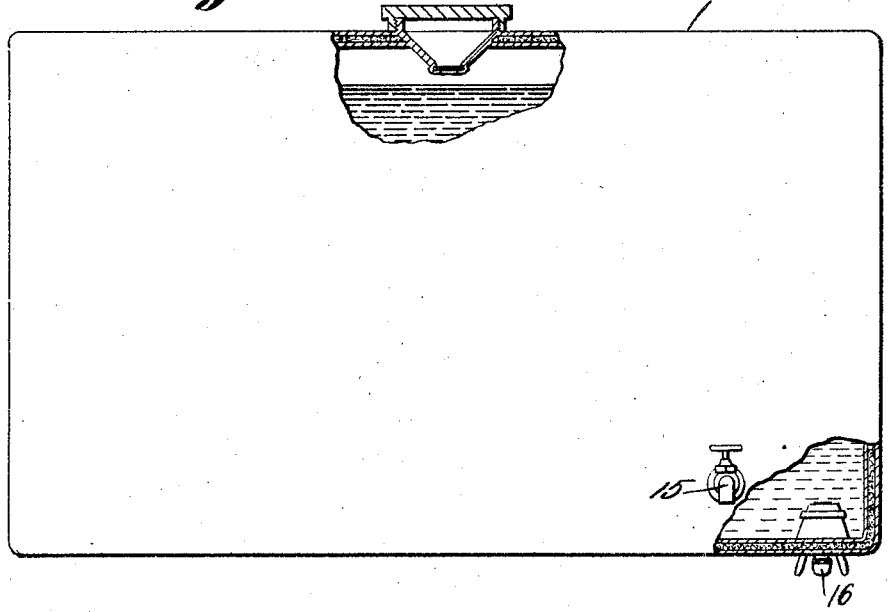
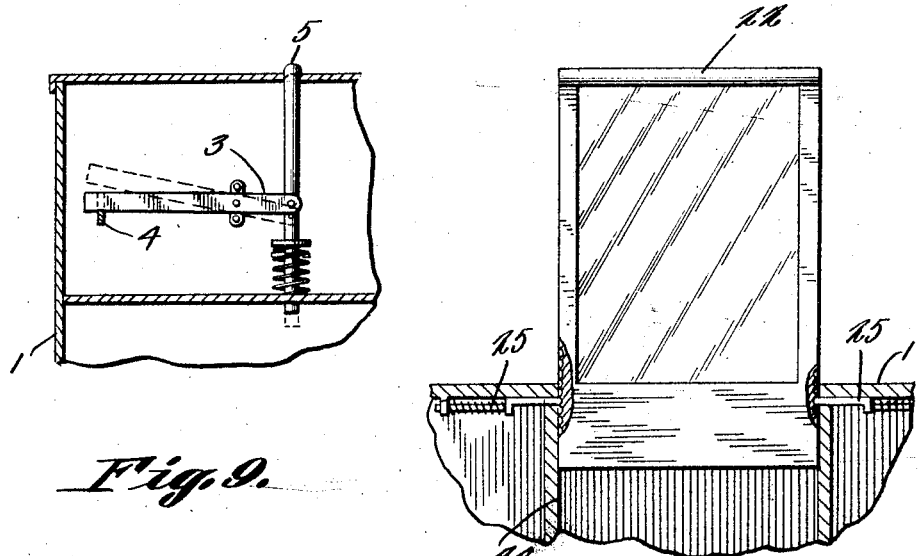
J. B. Burpo,
INVENTOR

Patented July 28, 1925.

1,547,897

UNITED STATES PATENT OFFICE.

JOSEPH B. BURPO, OF MARION, ILLINOIS.

AUTO CONSTRUCTION.

Application filed February 5, 1924. Serial No. 690,873.

*To all whom it may concern:*

Be it known that I, JOSEPH B. BURPO, a citizen of the United States, residing at Marion, in the county of Williamson and State of Illinois, have invented new and useful Improvements in Auto Constructions, of which the following is a specification.

This invention relates to a motor vehicle, the general object of the invention being to provide means for converting the vehicle into a bed by swinging rearwardly the back of the front seat and spreading over the two seats and said back a cover which is attached to a part of the rear seat and is normally carried by a spring clamp in folded position.

Another object of the invention is to provide a pair of hinged cases in the back part of the front seat back for carrying articles of different kinds and also to slidably mount a pair of mirrors in the said back so that a person in the back seat can make his toilet without leaving the vehicle as by swinging one of the cases downwardly it will act as a table.

Another object of the invention is to place a water tank in the rear of the vehicle and to connect the tank with a faucet on the back of the front seat and in the space covered by the cases so that an occupant can secure water without leaving the vehicle.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of a vehicle constructed in accordance with this invention.

Figure 2 is a longitudinal sectional view through Figure 1.

Figure 3 is a rear view with the door in raised position.

Figure 4 is a section on line 4—4 of Figure 2.

Figure 5 is a plan view with the parts in a position to form a bed.

Figure 6 is a sectional view through Figure 5.

Figure 7 is a sectional view with the cases on the front seat in open position and with the covers for the water tank compartment in open position.

Figure 8 is a view of the water tank with parts broken away.

Figure 9 is a detail sectional view of the spring latch means for holding the front seat in raised position.

Figure 10 is a detail sectional view of the means for holding one of the mirrors in adjusted position.

In these views 1 indicates the back of the front seat which is connected with the base of the seat by the roller hinge 2 so that the back can be swung into horizontal position and bridge the space between the front and rear seats. The back is held in raised position by the spring latches 3, carried by the back, and engaging keeper members 4 on a stationary part of the front seat. The latches have button carrying parts 5 which project above the top of the back so that they can be readily depressed by the fingers to release the latches and thus permit the back to be swung downwardly. A cover 6 has one end connected with a part of the rear seat as shown at 7 and this cover is normally held in folded condition by the spring latch bar 8 which is arranged on the floor of the automobile immediately in front of the rear seat. When the back of the front seat is swung downwardly it will bridge the space between the two seats and then the cover is placed over the said back and front seat in order to provide a bed. A chamber 9 is formed in the rear part of the rear seat to receive a water tank 10 which is preferably provided with double walls so as to keep the liquid therein either cold or hot for a long time. This tank is inserted through an opening in the top part of the portion in which the chamber is located and this opening is adapted to be closed by a door 11 and the door is closed by a flap 12, which is held in place by the latches 13, said flap being of the same material from which the upholstering is formed. A sliding door 14 is arranged in the rear of the body for providing access to the chamber 9 and a faucet 15 carried by the tank is arranged adjacent the door so that liquid can be drawn from the tank by raising this door. A tube 16 has one end connected to a nipple 17 on the tank by a suitable clamp and this tube extends through the body to a faucet 18 at the rear of the back of the front seat and which is covered by the hinged cases 19 when said cases are in closed position. Thus water can be secured from the tank without leaving the seat by simply swinging the upper case downwardly and manipulating the faucet. The two cases 19 are of box-like shape with the upper case hingedly connected with the lower case as shown at 20 and the lower case hinged to the rear of the back as shown at 21. Latches 22 are provided for the said cases and these latches are so arranged that the upper case can be moved to open position without opening the lower case. A pair of mirrors 23 have their frames slidably mounted in openings 24 formed in the back of the front seat, these openings extending through the upper edge of the back. Latch means 25 are provided for frictionally holding these mirrors in adjusted position with portions extending above the back. When these mirrors are not in use they are shoved downwardly into the openings and will thus be out of the way. The mirrors are moved by simply grasping their upper edges, the latch parts being formed so that they will frictionally hold the mirrors in adjusted position but will permit the mirrors to be moved when the mirrors are pulled outwardly or pushed inwardly.

From the foregoing it will be seen that the seats may be easily and quickly converted into a bed and by means of the cases and mirrors a person can readily make his toilet without leaving the rear seat. The cases can be utilized for carrying various articles so that such articles are readily at hand and they can be used as a table when in open position. The water tank enables a motorist to have a supply of water at hand and the occupants can quench their thirst without leaving the vehicle and without stopping the same. When desired, however, water can be taken from the tank from the rear of the vehicle by lifting the sliding door. By this invention the occupants of the vehicle can travel with great comfort as they can remove stains of travel without leaving the vehicle and by having the clothing and the like arranged in the cases it is not necessary to stop the vehicle to secure suitcases and the like from the running board or from the rack at the rear. By having the means for converting the seats into a bed, it is not necessary for tourists to carry a tent and the vehicle can be used as an ambulance when the necessity arises.

I prefer to yieldingly support the tank 2 in its chamber by means of the bottom and side springs 30 and also to provide means for automatically closing the outlet of the tank when the same is lifted out of its chamber. Such automatic means consists of a valve 31 which is normally held in closed position by the spring 32 and which is held in open position by a pin 33 passing through the nipple 17. This nipple is held in a socket 34 formed in the bottom of the tank by means of the spring actuated latch members 35 which engage keepers 36 formed in the socket 34. A gasket 37 serves to make a tight joint between the nipple and the walls of the socket. As shown in Figure 4 when these latch members are pressed outwardly by the fingers the nipple can be withdrawn from the socket and as it is withdrawn the pin 33 leaves the valve 31 so that the spring 32 will close the valve and thus prevent leakage of the water in the tank. When the tank is replaced the parts will automatically engage each other and the valve will be opened to permit the flow of water from the tank through the pipe 16. I also provide drainage means for the faucet 18, such means consisting of a pipe 38 having a funnel-shaped upper end placed under the faucet and having its lower end arranged to direct the waste water into a drainage funnel 39 placed in the bottom of the car.

The water from tank 10 can be caused to pass to the faucet on the back of the front seat under the action of gravity by having the upper part of tank 10 arranged above the level of the faucet. This latter case would be true in automobiles as now constructed where the rear seat is higher than the front seat.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A motor vehicle comprising front and rear seats, chambers formed in the backs of said seats, removable covers for the chambers, a tank in the chamber of the rear seat, a faucet in the chamber of the front seat, a tube connecting the faucet with the tank, a faucet connected with the tank and a door at the rear of the vehicle for providing access to said faucet.

2. A motor vehicle comprising front and rear seats, a chamber in the back of each seat, a cover for the chamber in the front seat composed of two box-like cases hingedly connected with each other, with the lower case hingedly connected with the rear part of the back of the front seat, latch means for holding the cases in closed position, a faucet in the front chamber, drainage means for draining water from the faucet through the bottom of the vehicle, a tank in the rear chamber, a tube connecting the tank with the faucet, a faucet connected with the lower part of the tank and a door in the rear of the vehicle for providing access to said faucet.

In testimony whereof I affix my signature.

JOSEPH B. BURPO.